United States Patent
Huque et al.

(10) Patent No.: US 9,179,301 B2
(45) Date of Patent: Nov. 3, 2015

(54) PROTECTION OF A COMMUNICATION CHANNEL OF A TELECOMMUNICATION DEVICE COUPLED TO AN NFC CIRCUIT AGAINST MISROUTING

(75) Inventors: Thierry Huque, Ramillies (BE); Olivier Van Nieuwenhuyze, Wezembeek-Oppem (BE)

(73) Assignee: PROTON WORLD INTERNATIONAL N.V., Zaventem (BE)

( * ) Notice: Subject to any disclaimer, the term of this patent is extended or adjusted under 35 U.S.C. 154(b) by 0 days.

(21) Appl. No.: 13/818,611

(22) PCT Filed: Aug. 25, 2011

(86) PCT No.: PCT/EP2011/064639
§ 371 (c)(1),
(2), (4) Date: May 15, 2013

(87) PCT Pub. No.: WO2012/038187
PCT Pub. Date: Mar. 29, 2012

(65) Prior Publication Data
US 2013/0225125 A1    Aug. 29, 2013

(30) Foreign Application Priority Data
Aug. 31, 2010   (FR) ..................................... 10 56906

(51) Int. Cl.
*H04W 12/00*   (2009.01)
*H04L 29/06*   (2006.01)
*H04W 12/08*   (2009.01)

(52) U.S. Cl.
CPC .............. *H04W 12/00* (2013.01); *H04L 63/10* (2013.01); *H04L 63/18* (2013.01); *H04W 12/08* (2013.01)

(58) Field of Classification Search
USPC ......................................................... 455/410
See application file for complete search history.

(56) References Cited

U.S. PATENT DOCUMENTS

| 6,070,243 | A | 5/2000 | See et al. |
| 6,092,191 | A | 7/2000 | Shimbo et al. |
| 7,974,536 | B2 * | 7/2011 | Yu et al. .................. 398/115 |
| 2004/0065735 | A1 | 4/2004 | Christoffers et al. |

(Continued)

FOREIGN PATENT DOCUMENTS

| CN | 1596018 A | 3/2005 |
| CN | 1933351 A | 3/2007 |

(Continued)

OTHER PUBLICATIONS

International Search Report and Written Opinion dated Jan. 17, 2012 from corresponding International Application No. PCT/EP2011/064639.

(Continued)

*Primary Examiner* — Asghar Bilgrami
(74) *Attorney, Agent, or Firm* — Seed IP Law Group PLLC

(57) ABSTRACT

A method for protecting data contained in a security module of a telecommunication device equipped with a near-field communication router and with a microcontroller, wherein data relative to the routing between the security module and gates of the router assigned to near-field communications are transmitted over a channel accessible by the router only, or by a control signal which is not generated by the microcontroller for the router.

20 Claims, 4 Drawing Sheets

(56) References Cited

U.S. PATENT DOCUMENTS

| | | |
|---|---|---|
| 2004/0232220 A1 | 11/2004 | Beenau et al. |
| 2005/0013310 A1 | 1/2005 | Banker et al. |
| 2007/0263596 A1 | 11/2007 | Charrat |
| 2008/0085001 A1 | 4/2008 | Charrat et al. |
| 2008/0219444 A1 | 9/2008 | Benteo et al. |
| 2008/0296978 A1 | 12/2008 | Finkenzeller et al. |
| 2009/0106824 A1 | 4/2009 | Morel et al. |
| 2009/0206984 A1* | 8/2009 | Charrat .................. H04L 63/10 340/5.2 |
| 2010/0084465 A1* | 4/2010 | Jolivet ................. G06K 7/0008 235/439 |
| 2010/0090805 A1 | 4/2010 | Libotte |
| 2010/0137025 A1 | 6/2010 | Tal et al. |
| 2010/0161403 A1* | 6/2010 | Fisher .................. G06Q 20/102 705/14.38 |
| 2010/0178867 A1 | 7/2010 | Charrat |
| 2010/0178868 A1 | 7/2010 | Charrat |
| 2010/0210300 A1 | 8/2010 | Rizzo et al. |
| 2010/0227553 A1 | 9/2010 | Charrat et al. |
| 2010/0245054 A1* | 9/2010 | Kim ................... G06K 7/10336 340/10.4 |
| 2010/0259216 A1 | 10/2010 | Capomaggio |
| 2011/0065398 A1 | 3/2011 | Liu et al. |
| 2011/0226853 A1* | 9/2011 | Soh .................... G06K 7/10237 235/380 |
| 2011/0237190 A1 | 9/2011 | Jolivet |
| 2011/0269423 A1* | 11/2011 | Schell et al. .................. 455/411 |
| 2012/0052801 A1 | 3/2012 | Kulkarni |
| 2012/0190299 A1* | 7/2012 | Takatsuka et al. ........... 455/41.1 |
| 2012/0190332 A1 | 7/2012 | Charles |
| 2013/0057640 A1* | 3/2013 | Callahan .................... 348/14.02 |
| 2013/0059563 A1 | 3/2013 | Huque et al. |
| 2013/0059566 A1 | 3/2013 | Huque et al. |
| 2013/0059567 A1 | 3/2013 | Huque et al. |
| 2013/0059568 A1 | 3/2013 | Huque et al. |
| 2013/0217325 A1 | 8/2013 | Ingels |
| 2013/0337770 A1 | 12/2013 | Huque et al. |
| 2014/0041036 A1 | 2/2014 | Huque et al. |
| 2014/0201815 A1 | 7/2014 | Van Nieuwenhuyze et al. |
| 2014/0289833 A1 | 9/2014 | Briceno et al. |

FOREIGN PATENT DOCUMENTS

| | | |
|---|---|---|
| CN | 101079013 A | 11/2007 |
| CN | 101202621 A | 6/2008 |
| CN | 101491052 A | 7/2009 |
| CN | 101536008 A | 9/2009 |
| EP | 1 909 431 A1 | 4/2008 |
| EP | 1 928 099 A1 | 6/2008 |
| EP | 2 034 705 A1 | 3/2009 |
| EP | 2 219 353 A1 | 8/2010 |
| FR | 2921786 A1 | 4/2009 |
| WO | 2007/068993 A1 | 6/2007 |
| WO | 2007/093580 A1 | 8/2007 |
| WO | 2009/115997 A2 | 9/2009 |
| WO | 2009/147094 A1 | 12/2009 |

OTHER PUBLICATIONS

International Search Report and the Written Opinion of the International Searching Authority from potentially related International Application No. PCT/EP2011/064643.

Smart Cards: UICC—*Contactless Front-end (CLF) Interface; Host controller Interface (HCI)*. (Release 7); ETSI Standard, Europena Telecommunications Standards Institute (ETSI), Sophia Antipois Cedex, France, vol. SCP-T, No. V7.4.0, Apr. 1, 2009, XP)14043836.

Pasquet M. et al., "*Payment with Mobile NFC Phones*" *How to analyze the security problems*, The 2008 International Symposium on Collaborative Technologies and Systems (CTS 2008), pp. 1-8, hai-00256675, verson 1, Feb. 16, 2008.

Smart Card Alliance: *Security of Proximity Mobile Payments*, A Smart Card Alliance Contactless and Mobile Payments Council White Paper, Smart Card Alliance, US, No. CPMC-09001, May 1, 2009, pp. 1-39, XP007913611.

ETSI TS 102 622, "Smart Cards; UICC—Contactless Front-end (CLF) Interface; Host Controller Interface (HCI) (Release 10)," V10.2.0, Technical Specification, Mar. 2011, 56 pages.

ETSI TS 102 695-2, "Smart Cards; Test specification for the Host Controller Interface (HCI); Part 2: UICC features (Release 7)," V7.2.0, Technical Specification, Oct. 2010, 62 pages.

Francis et al., "Potential Misuse of NFC Enabled Mobile Phones with Embedded Security Elements as Contactless Attack Platforms," The Institute of Electrical and Electronics Engineers, Inc., 2009, 8 pages.

French Search Report, dated Oct. 19, 2010, for French Application No. 1051693, 6 pages.

French Search Report, dated Oct. 21, 2010, for French Application No. 1051694, 7 pages.

French Search Report, dated Oct. 11, 2010, for French Application No. 1051695, 7 pages.

French Search Report, dated Nov. 23, 2010, for French Application No. 1051696, 7 pages.

French Search Report, dated May 4, 2011, for French Application No. 1060819, 6 pages.

International Search Report, mailed Apr. 6, 2011, for International Application No. PCT/EP2011/052899, 2 pages.

International Search Report, mailed Apr. 19, 2011, for International Application No. PCT/EP2011/052902, 2 pages.

International Search Report, mailed May 19, 2011, for International Application No. PCT/EP2011/052907, 3 pages.

International Search Report, mailed Jun. 8, 2011, for International Application No. PCT/EP2011/052930, 3 pages.

International Search Report, mailed Jun. 6, 2012, for International Application No. PCT/EP2012/055312, 2 pages.

International Search Report, mailed Mar. 23, 2012, for International Application No. PCT/FR2011/053023, 4 pages.

International Search Report, mailed Jul. 12, 2012, for International Application No. PCT/FR2012/050762, 3 pages.

Madlmayr et al., "Management of Multiple Cards in NFC-Devices," LNCS 5189, CARDIS 2008, pp. 149-161. (14 pages).

Madlmayr et al., "NFC Devices: Security and Privacy," The Third International Conference on Availability, Reliability and Security, pp. 642-647, 2008. (6 pages).

Rieback et al., "Keep on Blocking in the Free World: Personal Access Control for Low-Cost RFID Tags," LNCS 4631, Security Protocols 2005, pp. 51-59. (10 pages).

Written Opinion, mailed Mar. 9, 2010, for International Application No. PCT/EP2011/052899, 8 pages.

Written Opinion, mailed Apr. 19, 2011, for International Application No. PCT/EP2011/052902, 6 pages.

Written Opinion, mailed May 19, 2011, for International Application No. PCT/EP2011/052907, 8 pages.

Written Opinion, mailed Jun. 8, 2011, for International Application No. PCT/EP2011/052930, 8 pages.

Written Opinion, mailed Jun. 6, 2012, for International Application No. PCT/EP2012/055312, 8 pages.

Written Opinion, mailed Mar. 23, 2012, for International Application No. PCT/FR2011/053023, 6 pages.

Written Opinion, mailed Jul. 12, 2012, for International Application No. PCT/FR2012/050762, 5 pages.

\* cited by examiner

PROTECTION OF A COMMUNICATION CHANNEL OF A TELECOMMUNICATION DEVICE COUPLED TO AN NFC CIRCUIT AGAINST MISROUTING

CROSS REFERENCE TO RELATED APPLICATIONS

This application is a U.S. National Stage patent application based on International patent application number PCT/EP2011/064639, filed on Aug. 25, 2011, which application claims the priority benefit of French patent application number 10/56906, filed on Aug. 31, 2010, which applications are hereby incorporated by reference to the maximum extent allowable by law which is hereby incorporated by reference to the maximum extent allowable by law.

BACKGROUND

1. Technical Field

The present disclosure generally relates to transactions performed by means of mobile telecommunication devices of cell phone type. The present disclosure more specifically applies to such devices, further equipped with a near field communication circuit (NFC).

2. Discussion of the Related Art

Cell phones are more and more often equipped with a near-field communication interface which enables combining electromagnetic transponder functions with mobile telephony functions. In particular, this adds functions of emulation of an electromagnetic transponder, of contactless or contactless card reader type to the mobile telecommunication device, for example a personal digital assistant, a cell phone, a smartphone, etc. This considerably enhances the features of the mobile device, which can then be used, for example, as an electronic purse, as an access or transport ticket validation device, etc.

To emulate the operation of a contactless chip card, the mobile telecommunication device is equipped with a contactless front-end integrated circuit (CLF), also called NFC router. This router is equipped with a radio frequency (RF) transceiver front head associated with a low-range antenna to communicate like an electromagnetic transponder. The router uses the capacities of the processor(s) of the mobile device for data processing and storage operations. For access control, electronic purse, payment, and other applications, a secure element enabling to authenticate the user is used. This secure element is either integrated in the mobile telecommunication device (dedicated integrated circuit, circuit welded to the printed circuit board) or contained in a microcircuit supported by a subscriber identification module (SIM), or any other removable card, for example in the standard format of a memory card.

An NFC router may also be present in a mobile device of USB key type, in a bank teller terminal, in an adhesive device (sticker), etc.

An emulation of a contactless card in a mobile telecommunication device is capable of generating weak points in terms of transaction security.

It would be desirable to be able to detect such weak points.

It would further be desirable to avoid such weak points to secure transactions.

SUMMARY

It would be advantageous to overcome all or part of the disadvantages of mobile telecommunication devices associated with a near-field transmission module.

It would be advantageous to improve the security against a hacking attempt on a security module of subscriber identification module type, contained in a telecommunication device associated with a near-field transmission module.

An embodiment provides a method for protecting data contained in a security module of a telecommunication device equipped with a near-field communication router and with a microcontroller, wherein data relative to the routing between the security module and gates of the router assigned to near-field communications are transmitted over a pipe accessible by the router only, or by means of a control signal which is not likely to be generated by the microcontroller for the router.

According to an embodiment, said transmission of the data relative to the routing is performed by means of a pipe reserved to exchanges between the router and the module.

According to an embodiment, said transmission of the data relative to the routing is performed by means of a control signal reserved to exchanges between the router and the module.

According to an embodiment, said data contain the identifier of the pipe assigned to the communication.

According to an embodiment, said data contain a signature of the routing table.

According to an embodiment, said transmission of data relative to the routing is triggered by a detection of a communication between the router and a near-field communication terminal.

An embodiment also provides a telecommunication device equipped with a near-field communication router, comprising means for implementing the described method.

BRIEF DESCRIPTION OF THE DRAWINGS

The foregoing and other objects, features, and advantages of the present invention will be discussed in detail in the following non-limiting description of specific embodiments in connection with the accompanying drawings.

DETAILED DESCRIPTION

Figure 1:
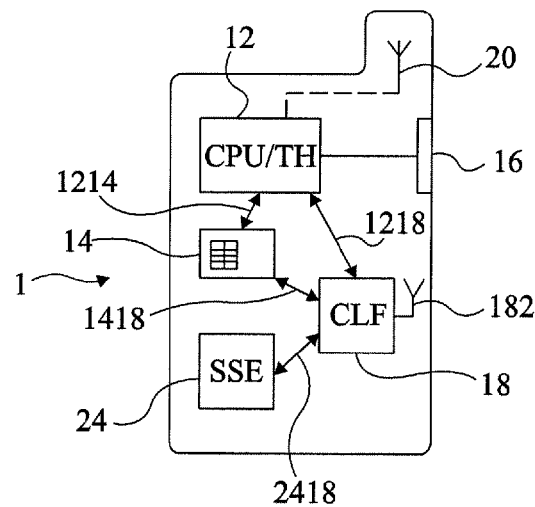
FIG. 1 schematically shows a mobile telecommunication device of the type to which the embodiments apply as an example.

The same elements have been designated with the same reference numerals in the different drawings. For clarity, only those elements and steps which are useful to the understanding of the embodiments have been shown and will be described. In particular, the coding and communication protocols, be it for near-field transmissions or for telecommunications in GSM mode, have not been detailed, the embodiments being compatible with usual protocols. Further, the circuits forming the mobile communication device have not been detailed either, the embodiments being here again compatible with usual devices, provided for them to be programmable.

FIG. 1 very schematically shows a mobile telecommunication device (for example, a cell phone) of the type to which the embodiments apply as an example. The different elements of interface with the user (keyboard, display, speaker, etc.) have not been shown, since these elements are not modified by the implementation of the embodiments which will be described.

Device 1 comprises a central processing unit 12 (CPU/TH) formed of at least one microcontroller forming the device core. This microcontroller is presently called a terminal host. For the telecommunication operation over a network (GSM, 3G, UMTS, etc.), the microcontroller uses identification and authentication data provided by a subscriber identification module 14 (SIM) which forms a security module of the device. Microcontroller 12 is capable of using one or several internal memories, not shown, of the telephone. Telephone 1 may also comprise a memory card reader 16 or other buses of communication with the outside to load data and/or applications into the telephone.

The mobile devices to which the described embodiments apply combine the telecommunication function with that of a near-field contactless transmission system (NFC). To achieve this, device 1 comprises a circuit 18 (CLF—ContactLess Front-End) forming a near-field communication module like an electromagnetic transponder. Module 18 is associated with an antenna 182 distinct from an antenna 20 intended for the mobile telephony network. Circuit 18 may be associated with a security module (SSE) 24 distinct from SIM card 14 and directly present on the printed circuit board of the telephone, or supported by a removable microcircuit card (for example, in the format of a memory card). Module 18 is also called an NFC router.

The different elements of device 1 communicate according to various protocols. For example, circuits 12 and 18 communicate over a link 1218 of I2C or SPI type, SIM card 14 communicates with microcontroller 12 over a link 1214 according to ISO standard 7816-3, and security module 24 communicates with router 18 according to this standard over a link 2418. Router 18 communicates with the SIM card, for example, over a single-wire bus 1418 (SWP—Single Wire Protocol). Other versions of protocols and links are of course possible.

The embodiments will be described in relation with a GSM telephone. The embodiments however more generally apply to any telecommunication device adapted to a mobile network (for example, Wifi, Bluetooth, WiMax, etc.) and associated with a contactless transmission module (NFC router), for example, a USB key, a bank terminal, a power consumption meter, or other), an access or transport ticket validation terminal, etc.

Similarly, the near-field communication module will be called a router since it generally integrates all the functions useful for the emulation of a contactless card within a same circuit, the described embodiments however applying to any NFC-type module.

Router 18 comprises physical terminals of connection to links 1218, 1418, and 2418 and manages logic gates for assigning these terminals to the different functions associated with near-field communications. Router 18 thus comprises a processor and volatile and non-volatile memories for storing, among others, a routing table for the different logic gates. Some gates are reserved for router administration functions while others can be freely assigned by the router.

In operation, router 18 makes available and manages different pipes of communication with the other circuits 12, 14, 24, etc. of the mobile device to provide these circuits access to the near-field communication functions, that is, to gates connected to radio frequency transmission circuits, called RF gates.

Figure 2:
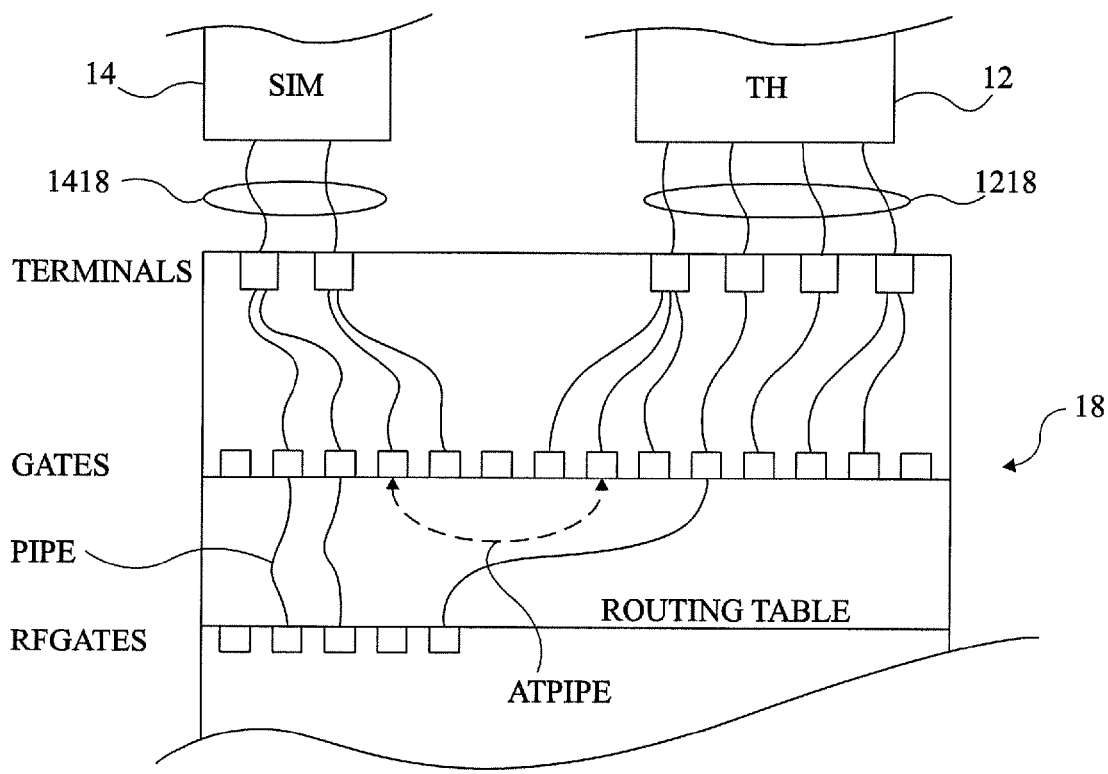
FIG. 2 is a diagram illustrating a function of a near-field transmission module of the device of FIG. 1.

FIG. 2 very schematically illustrates, in the form of blocks, the routing function of router 18. For simplification, FIG. 2 is a structural representation while, in practice, the assignment of the different gates to the different circuits of the mobile device is a software operation performed by the routing table.

Each of the router terminals (TERMINALS) is assigned one or several gates (GATES). In the example of FIG. 2, it is assumed that physical links 1418 and 1218 of SIM card 14 and of microcontroller 12 are connected to terminals of router 18 and that gates are assigned to these circuits. Several gates may be assigned to the same circuit (which is symbolized in FIG. 2 by the connection of a same terminal to several gates). The routing table of router 18 assigns some gates to internal functions (for example, configuration and administration functions), but also creates pipes (PIPE) between some gates assigned to the SIM card or to the RF microcontroller, and gates (RF GATES) comprised in module 18. This corresponds to the creation of pipes between the circuits external to router 18 and its RF transmission circuits for the implementation of the different applications requiring a near-field communication. For example, in bank, transport, electronic purse, access, and other applications which require a secure identification or authentication of the user, one or several pipes are created between the router and the SIM card to exploit the secure user identification data and validate the transaction.

The integration of NFC routers in mobile telecommunication devices and the sharing of the same security module (SIM card) generate weak points in terms of security. Authentication tools may be provided to make sure that the links between the router and the different external circuits are not pirated. However, this appears to be insufficient in view of a weak point that the present inventors have identified and which will be described hereafter.

Router or NFC module 18 generally is a single integrated circuit and its external accesses are rather well protected against possible hacking attempts.

Up to now, the main concern has been to guarantee that a near-field transaction emulated by the mobile device would not enable a pirate device intercepting the near-field communication to exploit data provided by the security module.

However, there remains a risk, since router 18 also manages a pipe (channel) (ATPIPE symbolized in FIG. 2) of communication between SIM card 14 or any other security module and microcontroller 12 of the mobile telecommunication device. This pipe is normally used so that SIM card 14 informs microcontroller 12 that a message reaches it over the NFC link. It is however also possible to divert this use to make security module 14 believe that it communicates with the router for a near-field transaction and thus over a pipe with the RF gates of the telephone, while it is actually communicating with microcontroller 12.

Figure 3:
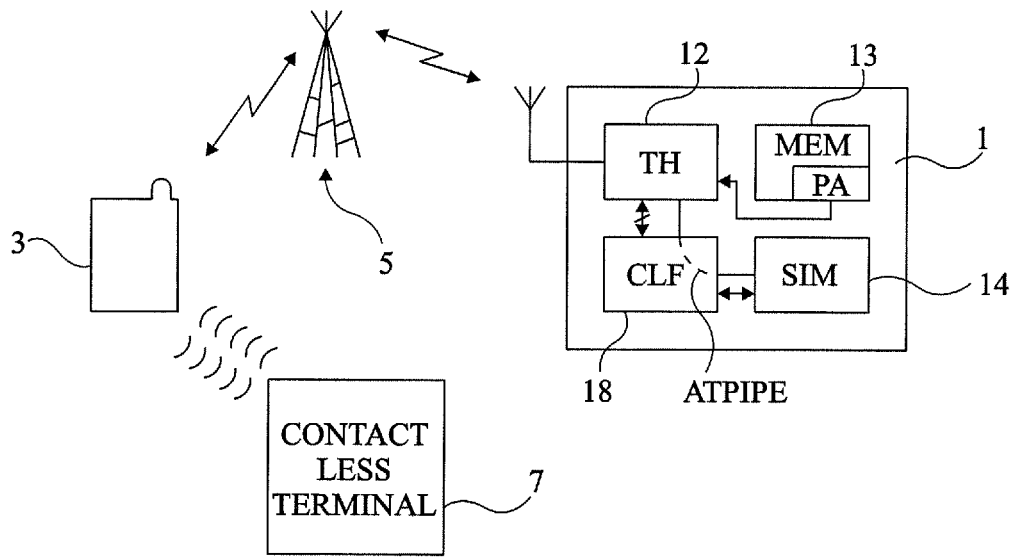
FIG. 3 very schematically illustrates an attack capable of exploiting a weakness of the telecommunication device of FIG. 1.

FIG. 3 very schematically illustrates in the form of blocks the possible exploitation of a pipe ATPIPE between a SIM card 14 and a microcontroller 12 of a cell phone 1.

It is assumed that, in a preparatory phase of the attack, GSM phone 1 has been hacked and a pipe ATPIPE has been diverted via router 18 between its SIM card 14 and its microcontroller 12. The routing table of router 18 thus contains the data of the "diverted" pipe. It is also assumed that a pirate application (PA) has been stored in a memory 13 (MEM) of phone 1 and that this application may provide instructions to microcontroller 12. Several embodiments of the preparatory phase will be discussed subsequently. The user of device 1, once it has been hacked by the loading of application PA and by the creation of pipe ATPIPE, is not capable, as will be seen hereafter, to notice a malfunction. He uses his telephone normally.

One of the functions of application PA is to automatically trigger a response of phone 1 after a request originating from the telecommunication network and transmitted by another mobile device 3 owned by the attacker. The pirate device for example is another GSM phone 3 which uses its own subscriber identification module to communicate over the GSM network (symbolized by a relay antenna 5). It may also be a microcomputer associated with a GSM module.

In the example of FIG. 3, device 3 is also equipped with a contactless router, for example, to initiate near field transactions with a terminal 7 (for example, an NFC terminal or any other contactless communication terminal). For example, device 3 is used to make a purchase with a payment to be validated by its NFC router.

Normally, for such a payment, the router of telephone 3 manages a communication pipe with the subscriber identification module (or another dedicated security module) of this telephone to authenticate the user and validate the payment.

In the mechanism of FIG. 3, at the payment validation, telephone 3 uses the GSM network to ask telephone 1 to validate the payment by means of its subscriber identification module. For example, device 3 sends an SMS over network 5 which, when received by telephone 1, is processed by the pirate application. Said application simulates requests from the RF gates and transmits them over pipe ATPIPE, so that identification module 14 responds and validates the transaction. This validation is diverted by microcontroller 12 and is sent back to device 3 which, in turn, transmits it to its NFC router to validate the payment for terminal 7. As a result, the payment is debited to the subscriber of telephone 1 and not to the attacker owning device 3. Most often, a contactless application requires no interaction with the terminal (7, FIG. 3) except for a presentation of a contactless device. In particular, no PIN keying is required for a near-field communication to avoid lengthening the transactions, so that device 3 may easily hack distant device 1.

The countermeasures providing encryptions and/or signatures between terminal 7 requesting the authentication and the security module are ineffective to counter this attack. Indeed, the data between terminal 7 and module 14 need no decoding. A communication pipe has actually been established between module 14 of telephone 1 and terminal 7 via telecommunication network 5, so that module 14 behaves as if it was in near field transaction with terminal 7.

The same type of piracy may occur for passage authentication or validation applications, of secure access type.

Further, this attack may also be successful even without pirate device 3 using its own NFC router, for example, if it uses a contactless communication mode, provided that the requested authentication originates from a security module and to respect the formats and protocols used by the NFC protocol. Further, such an attack may be used to divert any data from device 1 in favor of a pirate system (for example, data duplicating the content of the magnetic track of a card in a bank payment application).

Further, the attack may involve the SIM card of cell phone 1 or of any other security module (for example, module 24), provided that a pipe to be managed by router 18 between this module and a circuit (generally, microcontroller 12) is capable of managing communications over network 5.

This attack on near-field transactions, using the telecommunication network, is due to the presence of a communication pipe, via the NFC router, between a security module and a microcontroller connected to this router.

Implementing the attack requires a preparatory phase in which an intervention of the telephone 1 which is desired to be pirated is necessary. This preparation requires an intervention depending on the security level provided by the SIM card to the management of the NFC communication pipes.

In a simplified embodiment, the microcontroller is allowed to create a pipe on any free gate. In this case, a pirate application loaded into the microcontroller is capable of creating a pipe through the NFC router to the SIM card. If, afterwards, the SIM card performs no other checking than to acknowledge that the format of the requests corresponds to the format of a radio frequency frame originating from an NFC circuit, the pirate application may attack the SIM card.

According to another embodiment, security module 14 is more advanced and checks the association between the numbers of the pipes or of its own gates and the RF gates.

In a first case, it is considered that SIM card 14 does not take into account the circuit with which the gate is created (and thus, the fact that it may be a gate intended for the microcontroller). This embodiment uses the fact that the assignment of the pipe numbers (identifiers) is often sequential. It is first started by asking the microcontroller to eliminate a pipe between the SIM card and the RF gates. Then, a pipe having the same identifier is created between the microcontroller and the SIM card.

Figure 4:
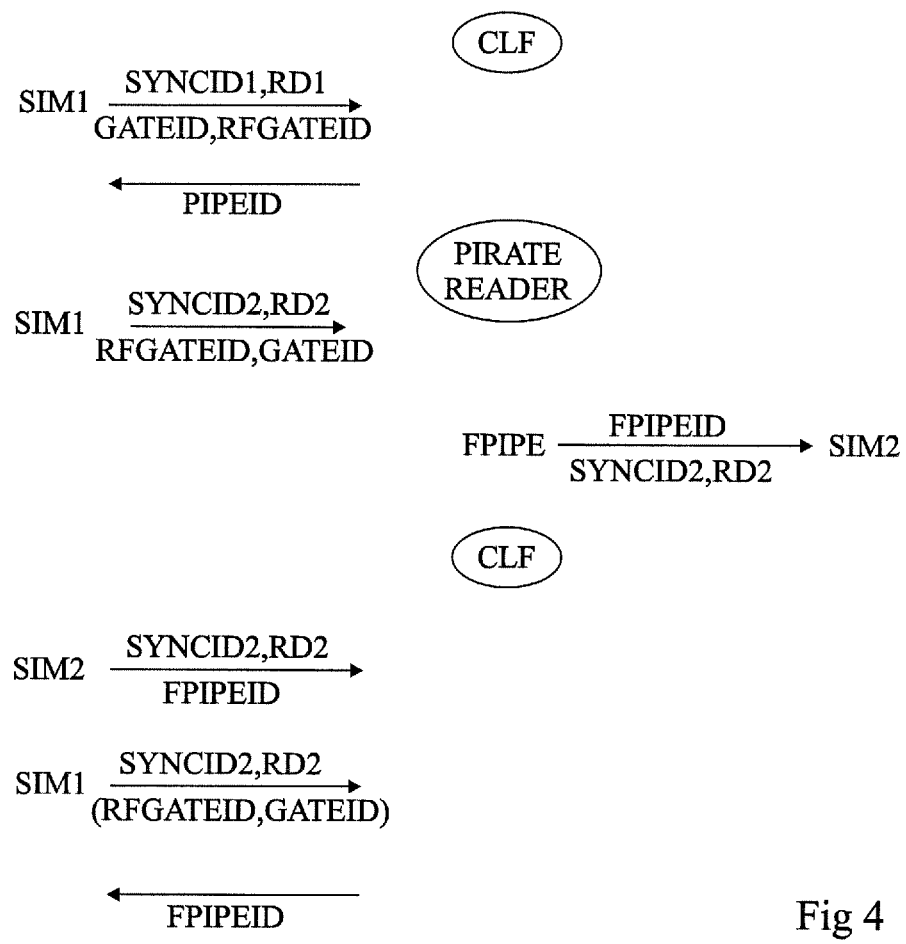
FIG. 4 illustrates an embodiment of a preparatory phase of such an attack.

FIG. 4 illustrates another embodiment of a preparatory phase of the attack aiming at diverting a pipe between router 18 (CLF) and the SIM card (SIM1) of a user. This embodiment is more specifically intended for systems in which the SIM card makes sure, before transmitting data to the CLF router, that it has effectively controlled the creating of the communication pipe therewith.

The fact that, prior to the initialization of device 1, the SIM card checks whether it has already been in the presence of router 18 is used herein. If it has not, it reconfigures the pipes between its gates and the NFC router.

In a normal operation, at the first connection of card SIM1 in telephone 1, the card causes the creating, at the level of the so-called transport layer, of at least one communication pipe, identified as SYNCID1, with the CLF router. For this purpose, card SIM1 sends to the CLF router both synchronization data SYNCID1 and a number (typically, a random number RD1). Number RD1 is stored in the CLF router and is used by card 14 to check that it has already caused the creation of a pipe with this router. On each initialization, the card verifies the existence of number RD1 in the router. To achieve this, the card requests from the router to create a pipe between one of its gates, identified as GATEID, and one of the RF gates, identified as RFGATEID. The router then creates a pipe and assigns it an identifier PIPEID and, at the same time, stores said identifier in the routing table and communicates it to card SIM1. Each time data are requested by the router, card SIM1 verifies that identifier PIPEID of the pipe is correct.

To implement the attack, the hacker should have cell phone 1 and card SIM1 in his possession for a period of time. This is relatively easy, for example, by asking the owner of the cell phone to lend it to supposedly make a call, or by fraudulently using a phone during a maintenance operation, for example, in a mobile telephony shop.

With card SIM1 and the telephone provided with router 1, the pirate starts by introducing card SIM1 into a pirate device (PIRATE READER), for example, another cell phone having a microcontroller capable of executing a piracy program complying with the described functions, or a computer provided with a card reader and simulating a router. Since card SIM1 has never met the NFC router of the pirate device or emulated by said device, it generates a new synchronization identifier SYNCID2. It sends back gate identifiers RFGATEID and GATEID to create the corresponding pipes. The pirate router then assigns, to at least one pair of gates, a pipe FPIPEID which corresponds to a gateway between the router and an external gate of the microcontroller instead of associating gate GATEID to an RF gate. Identifier FPIPEID and identifiers SYNCID2 and RD2 are then loaded into a falsified card SIM2. Card SIM2 then contains a routing table associating gates RFGATEID and GATEID with pipe FPIPEID.

Then, card SIM2 is introduced into telephone 1. Identifiers SYNCID2 and RD2 are then transferred to CLF router 18 to create pipe FPIPEID between gates designated as GATEID and RFGATEID. This amounts to modifying the routing table of the router so that when the pipe between gates GATEID and RFGATEID is called, the assigned pipe is pipe FPIPEID instead of PIPEID.

The assignment of pipe FPIPEID may take various forms according to the way in which the pipes are assigned to the gates in the router. For example, an observation phase of the gate assignment is gone through by placing card SIM2 in the router to observe the pipe assignment method, before introducing card SIM2 into the pirate reader.

The "real" card SIM1 is then placed back into telephone 1. Since the CLF router knows identifiers RD2 and SYNCID2, the card considers that it "knows" the router and does not recreate pipes therewith. When card SIM1 requests a communication towards gate RFGATEID, the router uses the assigned pipe FPIPEID.

The GSM terminal has effectively been hacked, that is, a pipe FPIPE (or ATPIPE, FIG. 2) has been created between a gate GATEID of the SIM card and a gate of microcontroller 12, while card SIM1 believes that this pipe connects its gate GATEID to gate RFGATEID. This pipe can then be diverted for a distant access over the GSM network from another terminal (FIG. 3). The downloading of pirate application PA can be performed either subsequently or at the same time as the pirate pipe generation.

There are various possibilities, depending on device 1. For example, the routing table may be read from. If this is not possible, it is possible, when card SIM1 is in the pirate reader, to emulate an operation of the CLF circuit, in order to obtain the full configuration stored in this card. A pirate card SIM2 or a card emulator may also be used to extract the data from the routing table in valid phone 1.

It can thus be seen that it is possible to parameterize the diverting of a communication pipe between a security module and an NFC router to establish a pipe between this module and the telephone microcontroller, external to the NFC router.

So that the user of telephone 1 does not notice the piracy, even when he uses his contactless mode, the pirate application should comprise the function of redirecting pipe FPIPE towards the RF circuits of the router when a data request towards the SIM is transmitted by router 18.

Figure 5:
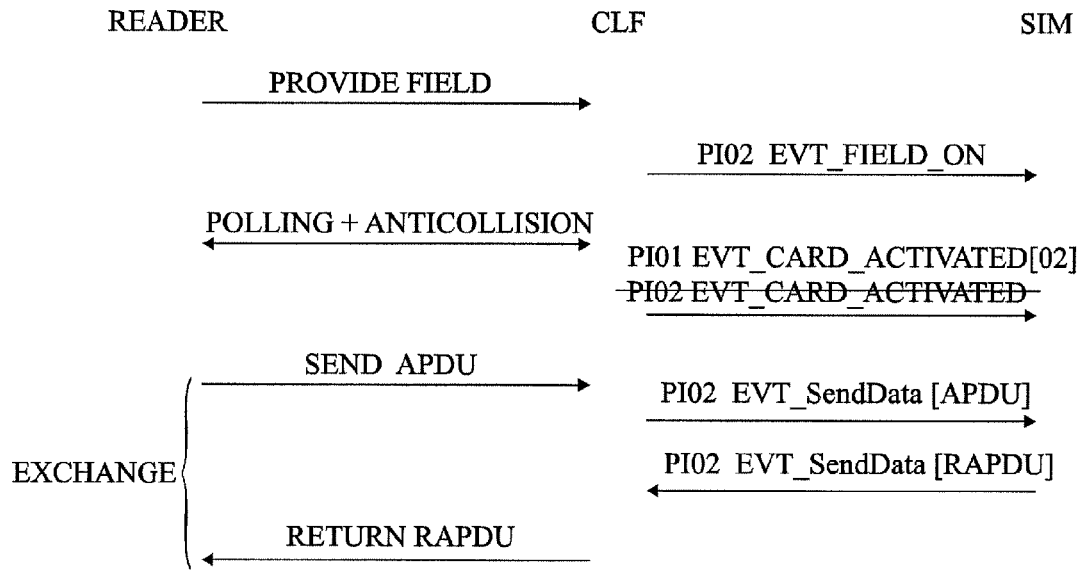
FIG. 5 illustrates an embodiment of a method of protection against such an attack.

FIG. 5 illustrates an embodiment of a mechanism for protecting a communication device against attacks such as described hereabove. This drawing very schematically shows the exchanges between a reader (READER) and the router (CLF) of the communication device as well as the exchanges between this router and the security module (SIM).

When it is activated, the reader emits a magnetic field (PROVIDE FIELD) towards different near field coupling devices. The CLF router detects this field and, as usual, uses an internal pipe PI02, arbitrarily designated as being pipe #2, to transmit to the SIM card, a control signal indicating the presence of a field (EVT_FIELD_ON).

A polling and anti-collision mechanism is then implemented between the reader and the router. Once these procedures have been completed, the router, in a usual embodiment (crossed out in FIG. 5), activates the card (EVT_CARD_ACTIVATED) by using the communication pipe PI02 opened between the router and the card. Here lies the weak point in the occurrence where the device has been hacked. Indeed, this control signal will be sent to the card, even if it does not follow the polling and anti-collision mechanism, if the router receives an activation control signal over the pirated pipe.

In the embodiment of FIG. 5, the router does not send the control signal over pipe 02, but via another communication channel PI01, having a set identifier which cannot be modified by the routing table, and including the identifier of the pipe assigned by the routing table in the control signal. Pipe PI01 used to transmit this control signal (EVT_CARD_ACTIVATED[02]) corresponds to the router administration pipe, which is thus not accessible by applications executed by the microcontroller. Accordingly, this control signal cannot be triggered by microcontroller 12 of device 1. The implementation of this embodiment requires for a direct exchange to be possible between the router and the SIM card over such an administration pipe, not managed by the routing table. Further, the SIM card should be designed to refuse any activation received over another pipe. The card is informed by control signal EVT_FIELD_ON received over pipe PI02 that it should expect an activation control signal over pipe PI01.

The rest of the exchanges between the router, the reader, and the card amounts to sending various control signals APDU (Application Protocol Data Unit) allowing a communication between the reader and the card. Each exchange EXCHANGE comprises, in usual fashion, the sending of a control signal (SEND APDU) by the reader to the router, which transmits it to the card over pipe PI02 (EVT_Send Data [APDU]). The SIM card then returns data RAPDU (Return Application Protocol Data Unit), still over pipe PI02 (EVT_Send Data [RAPDU]). Finally, the router transmits data RAPDU to the reader (RETURN RAPDU).

If the device has been hacked, the routing table has been modified in the CLF router. However, the SIM card remains inaccessible since the activation control signal from the router cannot be triggered from microcontroller 12.

Figure 6:
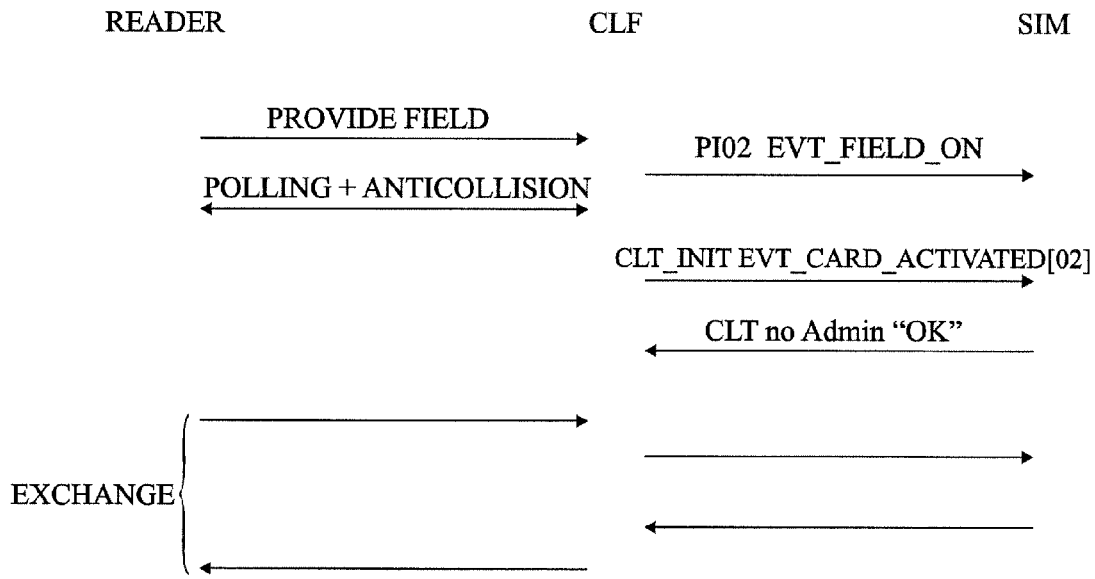
FIG. 6 illustrates another embodiment of a method of protection against the attack illustrated in FIG. 3.
Figure 7:
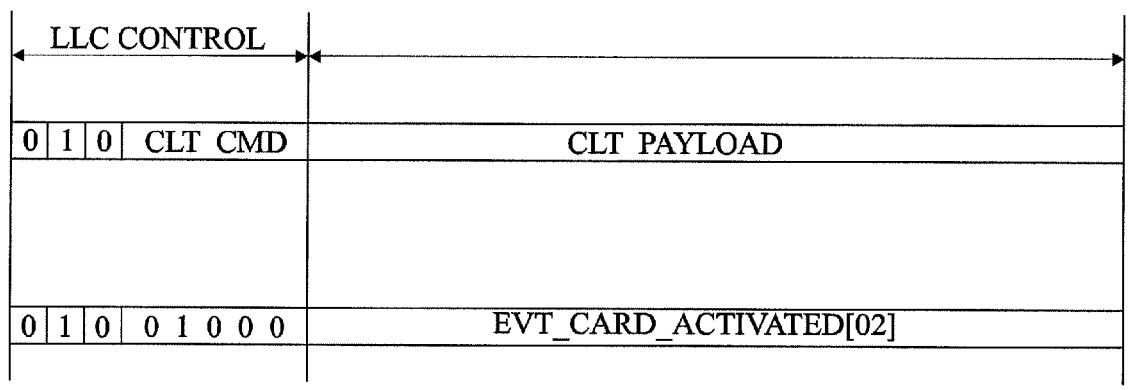
FIG. 7 illustrates a control signal used in the embodiment of FIG. 6.

FIGS. 6 and 7 illustrate another embodiment of the protection method. FIG. 6 shows an example of exchange between a reader and the CLF router of device 1 as well as the exchanges between this router and the SIM card of the device. FIG. 7 shows an example of the format of a control frame for implementing exchanges in FIG. 6.

As in the previous embodiment, a transmission starts with an activation of the reader (PROVIDE FIELD), a notification to the card (EVT_FIELD_ON) over an arbitrarily-selected communication pipe PI02, followed by a polling and anti-collision mechanism.

According to this embodiment, the router uses a specific control signal (CLT) available in the standards of exchange between a router and a security module (for example, defined in ETSI standard 102613).

This control signal is used to transmit the routing data to the card (CLT_INIT EVT_CARD_ACTIVATED[02]). These data are, for example, an HCI identifier, directly followed by the pipe number (02 as illustrated in FIG. 5). As a variation, a signature of the routing table enabling the SIM card to check that its own table has not been altered is also transmitted.

The CLT frames can only be exchanged between the router and the security module or between the router and microcontroller 12, but not between the microcontroller and the security module. Such a control cannot be generated by the microcontroller for the security module. As with the embodiment of FIG. 5, even if the routing table has been hacked, the pipe thus cannot be opened under control of the microcontroller.

FIG. 7 illustrates the usual content of a usual CLT frame and of a routing data transmission CLT frame. A first byte is a control field having its five least significant bits identifying the executed command. It is provided to use a bit commonly designated as RFU to notify the card that a routing configuration message is being sent. The next bytes of the frame (possibly up to 29 bytes in the above-mentioned standard) transmit control signal EVT_CARD_ACTIVATED with the pipe number, for example, 02.

When the card receives control signal CLT_INIT, it responds with a control signal CLT no Admin "OK".

Then, the transaction may be carried out in usual fashion (EXCHANGE) as discussed in relation with FIG. 5.

The embodiment of FIGS. 6 and 7 requires parameterizing the routers and the SIM cards so that they are able to interpret these specific control signals.

Further, in both embodiments, the router is configured to send, after the initialization procedures with the reader, specific control signal CLT or the activation on predefined pipe PI01.

It should be noted that most devices equipped with an NFC router should have the ability to operate even when they are off, that is, by being remote-supplied by a read terminal containing them in its field. This is not a weak point in above-advocated solutions. Indeed, when device 1 is off, its microcontroller is also off. There thus is no risk to have a pirate communication over the GSM network to validate a distant purchase.

Various embodiments have been described, various alterations and modifications will occur to those skilled in the art. In particular, the practical implementation embodiments by using standardized NFC router transmission protocols is within the abilities of those skilled in the art based on the functional indications described hereabove and referring to standards ETSI 102613 and ETSI 102622.

Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method to protect data stored in a security module of a telecommunication device equipped with a near-field communication (NFC) router and with a microcontroller, the method comprising:
   providing a routing table, the routing table arranged to define communication pipes between the security module, the NFC router, and the microcontroller;
   defining a router administration pipe, the router administration pipe separate from the routing table and inaccessible to applications executed by the microcontroller;
   defining in the routing table a first pipe between the security module and the microcontroller; and
   passing a control signal directly from the NFC router to the security module, the control signal indicating that the NFC router is in proximity to an NFC reader, the control signal passed over the router administration pipe.

2. The method of claim 1, comprising:
   transmitting data relative to the routing table via the router administration pipe.

3. The method of claim 1, comprising:
   transmitting data relative to the routing table is performed by a control signal reserved to exchanges between the NFC router and the security module.

4. The method of claim 3, wherein said data contains an identifier of the first pipe.

5. The method of claim 1, wherein said data contains a signature of the routing table.

6. The method of claim 3, wherein said transmission of data relative to the routing table is triggered by a detection of a communication between the NFC router and a near-field communication terminal.

7. A telecommunication device equipped with a near-field communication router, comprising means capable of implementing the method of claim 1.

8. A mobile telecommunications device, comprising:
   a microcontroller;
   a security module; and
   a wireless communication router, the wireless communication router having radio frequency (RF) gates coupled to RF transceiver circuitry of the wireless communication router and terminals coupled to the security module and the microcontroller, the wireless communication router further having internal gates coupled between the terminals and the RF gates, wherein one or more pipes are configurable to communicatively couple various ones of the terminals to various ones of the RF gates, wherein a routing table is configurable to define the one or more pipes and thereby define one or more communication paths between the microcontroller, the security module, and the wireless communication router, wherein the routing table is arranged to define at least one pipe of the one or more pipes between the microcontroller and the security module, and wherein a valid control signal indicating that the wireless communication router is in proximity to a wireless communication reader is only passed to the security module on a router administration pipe directly between the wireless communication router and the security module, wherein the router administration pipe is separate from the routing table and inaccessible to applications executed by the microcontroller.

9. The mobile telecommunications device of claim 8, wherein the security module is a subscriber identity module (SIM) card.

10. The mobile telecommunications device of claim 8, wherein the wireless communication router is a near-field communication (NFC) router.

11. The mobile telecommunications device of claim 8, comprising:
   a subscriber identity module (SIM) card, the SIM card configured to store secure information.

12. The mobile telecommunications device of claim 8, comprising:
   a memory configured to store microcontroller executable instructions, the microcontroller executable instructions arranged to govern communications between the microcontroller and the wireless communication router.

13. The mobile telecommunications device of claim 8, wherein the mobile telecommunications device conforms to a GSM protocol.

14. A method to protect data stored in a telecommunication device, comprising:
   detecting first access to a subscriber identity module in the telecommunication device;

loading a routing table, the routing table defining a first communication pipe between a microcontroller circuit and a security module;

prohibiting a communication transaction between the wireless communication circuit and the security module before a first control signal has been detected;

detecting the first control signal, the first control signal indicating that the wireless communication circuit is in proximity to a wireless communication reader, the first control signal passed directly on a router administration pipe, the router administration pipe separate from the routing table and inaccessible to applications executed by the microcontroller; and communicating secure data from the security module.

15. The method of claim 14, wherein the security module is a subscriber identity module (SIM) card.

16. The method of claim 14, wherein the wireless communication circuit is a near-field communication (NFC) router and the wireless communication reader is an NFC reader.

17. The method of claim 14, comprising:
loading the routing table with information to define a second communication pipe between the wireless communication circuit and the microcontroller, the second communication pipe different from the first communication pipe.

18. The method of claim 14, comprising:
pre-loading the routing table with information to define a second communication pipe between the wireless communication circuit and the microcontroller, the second communication pipe different from the first communication pipe, the pre-loaded information being fixed and unchangeable.

19. The method of claim 15, comprising:
detecting modification of the routing table after secure data has been communicated from the SIM card and preventing further access of the secure data in the SIM card.

20. The method of claim 15, wherein the control signal conforms to ETSI standard 102613.

* * * * *